United States Patent
Goder

[19]

[11] Patent Number: 5,770,940
[45] Date of Patent: Jun. 23, 1998

[54] SWITCHING REGULATOR

[75] Inventor: Dimitry Goder, Sunnyvale, Calif.

[73] Assignee: Switch Power, Inc., San Jose, Calif.

[21] Appl. No.: 512,974

[22] Filed: Aug. 9, 1995

[51] Int. Cl.$^6$ .................................................. G05F 1/56
[52] U.S. Cl. ........................................ 323/282; 323/285
[58] Field of Search .......................... 323/282, 284–287; 363/21, 23, 25

[56] References Cited

U.S. PATENT DOCUMENTS

| | | | |
|---|---|---|---|
| 5,399,958 | 3/1995 | Iyoda | 323/282 |
| 5,481,178 | 1/1996 | Wilcox et al. | 323/287 |
| 5,523,936 | 6/1996 | Leu et al. | 363/21 |

Primary Examiner—Matthew V. Nguyen
Attorney, Agent, or Firm—William B. Walker

[57] ABSTRACT

A switching regulator and a method of regulating voltage by means of a switching regulator, includes a regulator switch, a smoothing filter, and a first voltage feedback loop from an output of he regulator to a control line of the switch. The first feedback loop may include a hysteresis comparator or a comparator and a frequency reference connected to the control line of the switch. The first feedback loop uses the A.C. ripples at the output of the smoothing filter as a ramp signal feedback to substantially instantaneously correct output voltage. A second voltage feedback is further employed to stabilize the output voltage. The smoothing filter employs an LC circuit and the regulator is provided with means for providing an inductor current path when the switch is opened. The regulator may, further, include a current feedback loop.

28 Claims, 6 Drawing Sheets

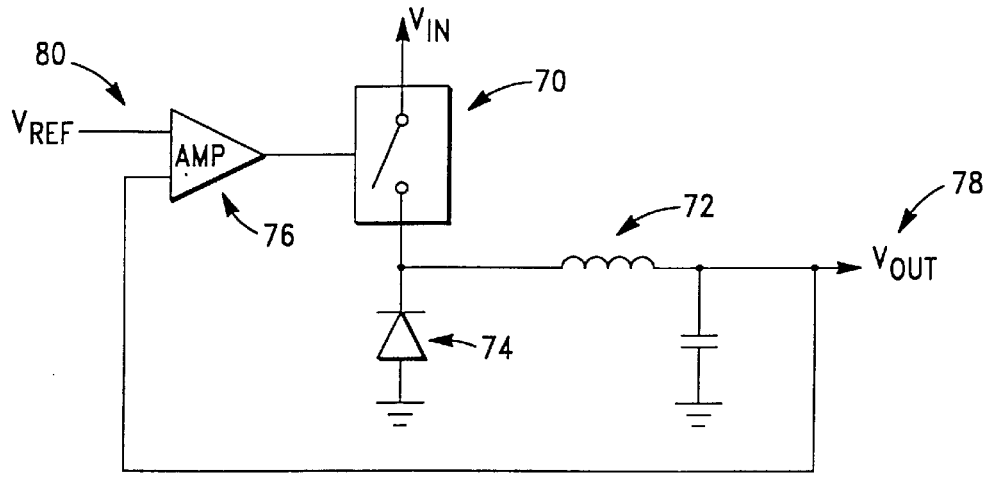
FIG.—3
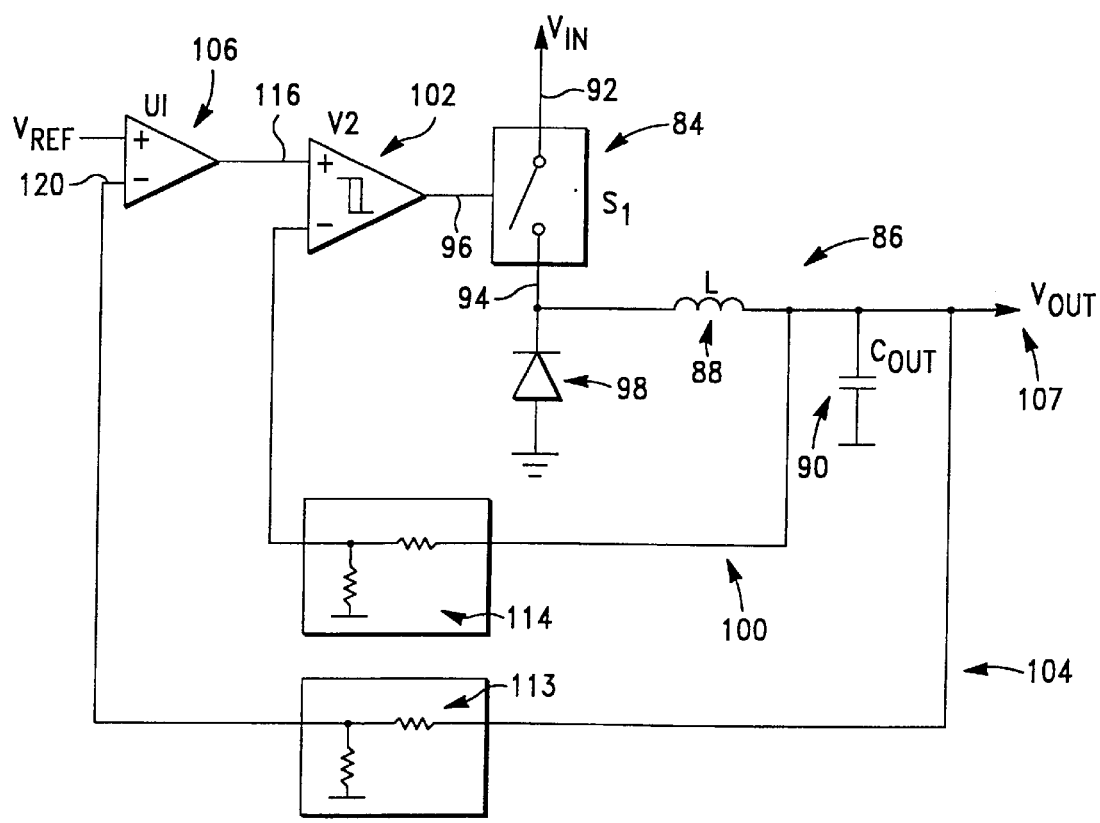
FIG.—4

5,770,940

SWITCHING REGULATOR

FIELD OF THE INVENTION

This invention relates to a switching regulator.

BACKGROUND OF THE INVENTION

Switching regulators are commonly used for providing a regulated power supply. They typically include an input switch which receives the unregulated power and is intermittently turned on and off. By suitably adjusting the duty cycle of the input switch, the regulated output voltage can be controlled to lie within a certain range. The regulator typically also includes a low pass filter, for instance an LC circuit comprising an inductor and a capacitor, to smooth the output voltage. Typically a free wheeling diode or synchronous switch is connected between ground and the inductor to provide a current path when the input switch is opened.

Various prior art switching regulators have been developed. These include a voltage mode step-down regulator in which a sawtooth waveform is generated and compared to the output voltage of an error amplifier, connected to the output of the regulator circuit. The feedback from the output line is amplified using an amplifier, before the voltage is fed to the comparator. The response time is dictated largely by delays in the amplifier. As a result, any input line transients or load transients remain unregulated for the duration of the delay.

In an attempt to address the delay in response to input transients, another prior art device uses current mode control. Instead of generating an artificial sawtooth waveform, the comparator receives a waveform based on the inductor current. As a result of the regulator switching action, the inductor current takes a sawtooth waveform, and is therefore well suited as a ramp source for the control circuit. The advantage of the circuit is noticeable during input line transients; the current slope changes within one cycle, being determined by the voltage across the inductor. Thus, correction for input line transients commences within one cycle of the oscillator signal. Since no error amplification is required, no delays are caused due to loop response time. Thus a faster response is obtained for input line transients. However, load transients remain undetected by this circuit. These transients are, therefore, still compensated by an error amplifier, again causing significant delays due to loop response time.

Yet another prior art switching regulator uses a circuit in which the output is connected directly to the input of an error amplifier that controls an input switch. Since the opening and closing of the input switch is dictated directly by a feedback loop, the circuit oscillates about a reference point at a frequency depending on the total loop delay. While the circuit provides for a much faster transient response, it is less stable, since its frequency is dependent on the total loop delay.

The present invention seeks to provide an improved switching regulator.

OBJECTS AND SUMMARY OF THE INVENTION

It is an object of the invention to provide a switching regulator with a well defined operating frequency.

It is a further object of the invention to provide a switching regulator that provides a fast transient response.

It is yet a further object of the invention to provide a switching regulator having two separate feedback paths to provide for a fast response and to sense output voltage at a remote location to compensate for power line voltage loss.

According to the invention there is provided a switching regulator comprising:
 a first switch having an input, an output and a control line;
 a low pass filter connected to an output of the regulator; and
 a feedback loop from an output of the regulator to the control line of the switch, the feedback loop including a comparator with built in hysteresis, for providing a well defined switching frequency of the first switch, the comparator having a reference voltage input, and an output connected to the control line.

The feedback loop can extend from a remote point along an output line of the regulator.

The regulator can comprise a second feedback loop from the output of the regulator, the second feedback loop including an amplifier, having a DC voltage input, and an output which is connected to the reference voltage input of the comparator.

The regulator can comprise a free wheeling diode connected to ground and providing a current path for the inductor when the first switch is opened.

The regulator can comprise a second switch connected to ground to provide a current path for the inductor when the first switch is opened, the second switch being controlled by a signal that is inverted relative to the signal switching the first switch, to insure that only one of the switches is closed at any one time.

The regulator can comprising a transformer, wherein the voltage across a primary winding of the transformer is controlled by the switch, and wherein a secondary winding is connected to the low-pass filter.

Further, according to the invention there is provided a switching regulator comprising:
 a switch, having an input, an output and a control line;
 a low pass filter connected to an output of the regulator;
 a voltage feedback loop from an output of the regulator to the control line of the switch, wherein the feedback loop includes a comparator having an output, a first input connected to the output of the regulator, and a reference voltage input, the feedback loop further including a frequency reference connected to the control line of the switch for regulating the switching of the switch.

The regulator can comprise a second feedback loop from the output of the regulator, the second feedback loop including an amplifier having a voltage input, and an output which is connected to the reference voltage input of the comparator.

The frequency reference can comprise an oscillator and a flip flop, wherein the oscillator is connected to a first input of the flip flop, and the output of the comparator is connected to a reset input of the flip flop, an output of the flip flop being connected to the control line of the switch.

The frequency reference can comprise a one shot connected between the output of the comparator and the control line of the switch.

Still further, according to the invention there is provided a step down switching regulator comprising:
 a first switch having an input, an output and a control line;
 a low pass filter connected to an output of the regulator;
 a first feedback from an output of the regulator to the control line of the switch, the first feedback including a comparator having first and second inputs, and an output which is connected to the control line of the switch; and a second, voltage feedback from the output of the regulator, wherein the second, voltage feedback includes an amplifier having a reference voltage input and an output connected to the first input of the comparator.

The regulator can comprise a current feedback that is DC coupled to the second input of the comparator, and wherein the first feedback is AC coupled to the second input of the comparator.

Still further, according to the invention there is provided a method of regulating voltage by means of a step-down switching regulator that includes a regulator switch, the method comprising the steps of monitoring the output voltage of the regulator; regulating the switching of the regulator switch by means of a comparator output signal, the comparator receiving a first input signal based on the output voltage of the regulator and a second input signal from an amplifier output, the inputs of the amplifier being based on the output voltage of the regulator and a reference voltage.

The comparator can have built-in hysteresis.

The control voltage can be a DC reference voltage.

The comparator output signal can be fed to a frequency reference, which is connected to a control line of the regulator switch.

BRIEF DESCRIPTION OF THE DRAWINGS

FIG. 3 is a schematic circuit diagram of yet another prior art switching regulator;

FIG. 4 is a schematic circuit diagram of a step-down switching regulator in accordance with the invention;

DETAILED DESCRIPTION OF THE INVENTION

Figure 1:
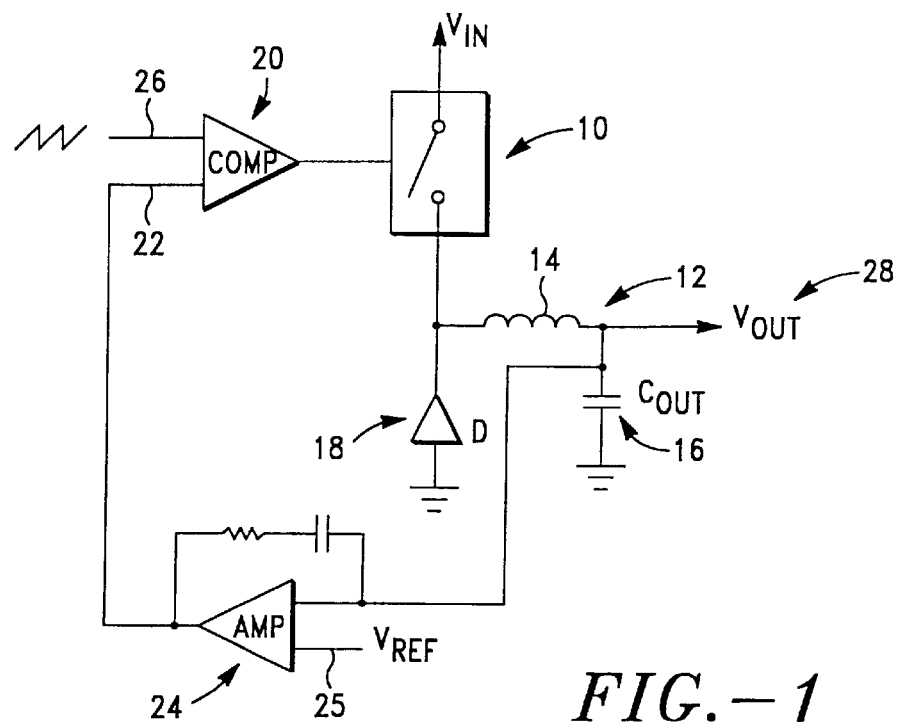
FIG. 1 is a schematic circuit diagram of a prior art switching regulator.

A schematic circuit diagram of a prior art step-down switching regulator is illustrated in FIG. 1. It includes a switch 10 and an LC circuit 12 comprising a n inductor 14 and a capacitor 16. A free wheeling diode 18 is connected between the ground and the switch 10. The free wheeling diode 18 provides a current path for the inductor 14 when the switch 10 opens. The circuit further includes a comparator 20 having a first input 22 connected to the circuit output via an amplifier 24 . The second input of the comparator, indicated by reference numeral 26, receives a separately generated sawtooth input signal. It will be appreciated that as the voltage level at the circuit output 28 changes the level at the input 22 changes accordingly. The artificially generated sawtooth signal at the input 26, on the other hand, remains constant so that the voltage changes at the input 22 cause a corresponding change in the duty cycle of the switch 10. This change in the on time of the switch 10 causes a corresponding change in the output voltage 28. In order to adjust the output voltage level, the amplifier 24 is provided with a reference voltage input 25. It should be noted that the circuit of FIG. 1 has various drawbacks. In the case of input line transients or load transients, the response time depends on the total loop speed, which is 30 dictated largely by the amplifier 24. This causes significant response time delays, causing the output to remain unregulated for relatively long periods of time.

Figure 2:
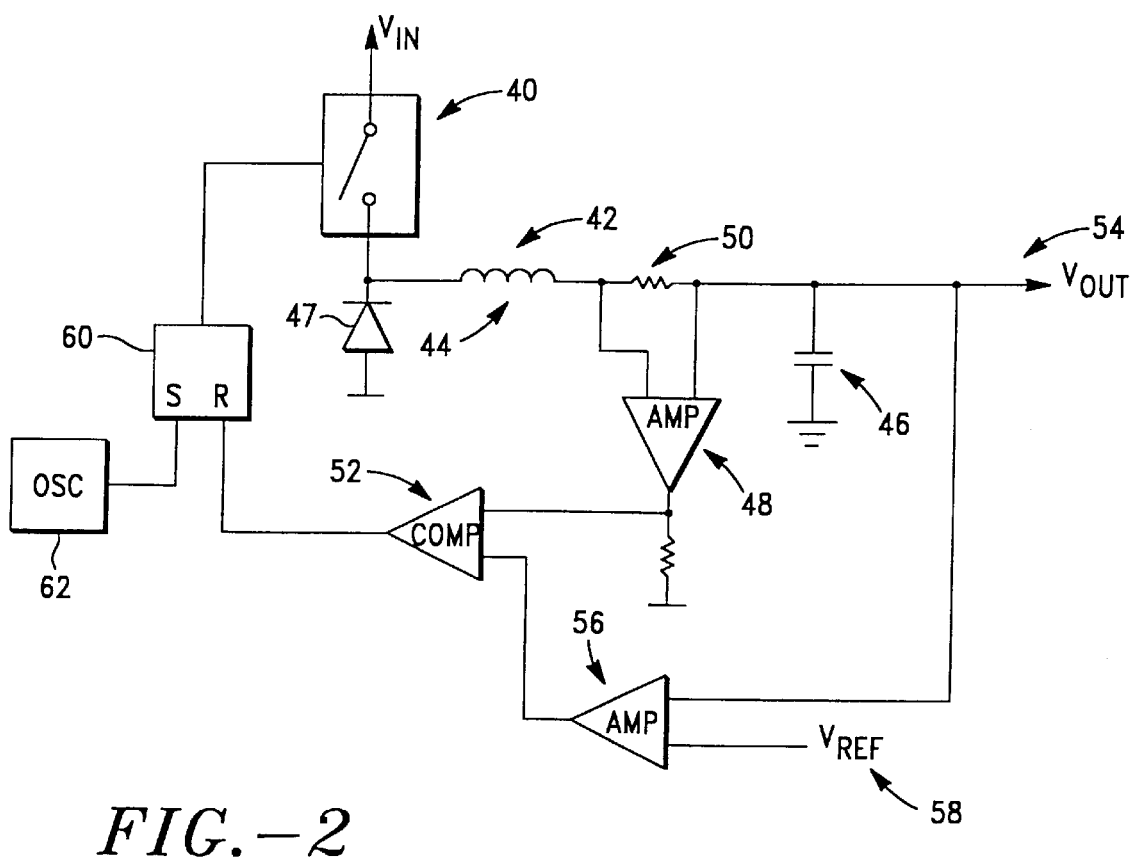
FIG. 2 is a schematic circuit diagram of another type of prior art switching regulator.

FIG. 2 is a circuit diagram of another prior art step-down switching regulator, which uses a current mode control. It includes a switch 40 and an LC circuit 42 comprising an inductor 44 and a capacitor 46. Again, a free wheeling diode 47 is included to provide a current path for the inductor 44 when the switch 40 is turned off. The circuit further includes an inductor current sensor, which in this circuit comprises an amplifier 48 connected across a resistor 50. Other prior art circuits exist that make use of different current sensing means such as a current sensing transformer. The circuit in FIG. 2, further includes a comparator 52, receiving its inputs from the output of the amplifier 48 and from the circuit output 54, via an error amplifier 56. As in the previous circuit, the error amplifier receives a reference voltage, which, in this example, is indicated by reference numeral 58. The output of the comparator is fed to a frequency reference, which in this circuit comprises an oscillator/flip flop circuit. The output of the comparator 52 is fed the reset pin of an R-S flip flop 60, the set input of which is connected to an oscillator 62. Instead of having an artificially generated sawtooth waveform fed directly into the comparator, as in the previous circuit, the comparator 52 receives its input from the amplifier 48. The oscillator 62 provides a set frequency to the flip flop 60, which in turn controls the switch 40. The voltage across the inductor 44 therefore comprises a substantially square waveform. Since the current through the inductor 44 is given by $I = L \int V \, dt$, the current waveform through the inductor 44 will be a sawtooth waveform, the slopes of the waveform ramps depending on the voltage across the inductor 44. The voltage waveform across the resistor 50 is a corresponding sawtooth waveform. This is fed into the amplifier 48, the output of which provides a sawtooth input for the comparator 52. Thus the advantage of the circuit of FIG. 2, is that input voltage transients cause the slopes of the saw tooth current waveform to change according to the expression $V = L \, dI/dt$. These are thus quickly detected, thereby resulting in rapid compensation. On the other hand, load transients are still dictated by the error amplifier 56, resulting in a slow response time.

Figure 6:
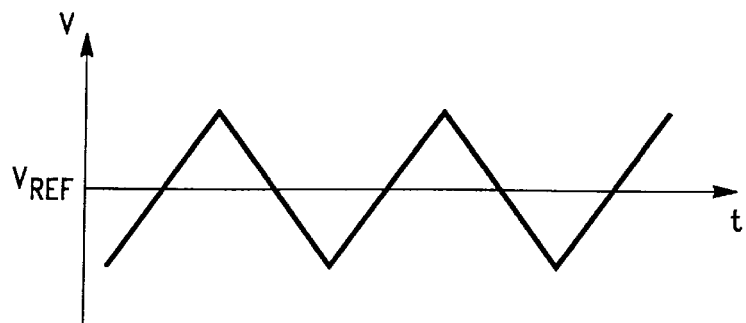
FIG. 6 is a representation of an output voltage ripple in a circuit not making use of a hysteretic comparator.

Yet another prior art step-down switching regulator circuit is illustrated in FIG. 3. This circuit again includes a switch 70 and a filtering LC circuit 72. The free wheeling diode 74 provides a current path when the switch 70 is open. In this circuit the amplifier 76 is connected directly to the output 78, the other input 80 of the amplifier 76, receiving a reference voltage. The response time depends directly on the delay in the loop. The delay is short, resulting in a quick response to both input and load fluctuations. In this circuit, the delay in the circuit itself determines the magnitude of the sawtooth ripple. When the circuit output reaches the desired reference voltage level, the switch 70 is turned off, allowing the output voltage to ramp down. Delays in the feedback loop cause the output voltage to oscillate about the reference voltage as indicated by the wave diagram of FIG. 6. Since the response time dictates the frequency of the oscillation, the circuit is prone to instability.

Figure 7:
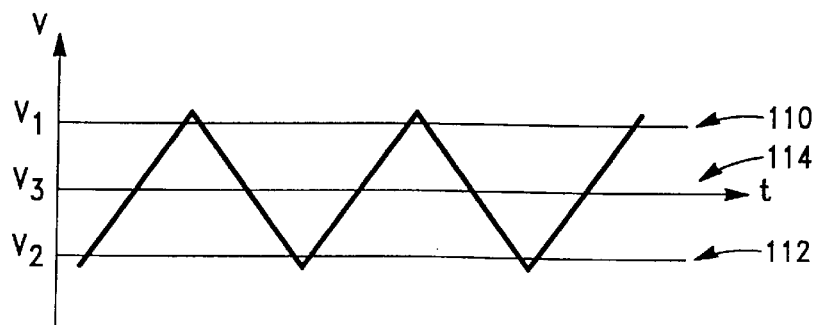
FIG. 7 is a representation of an output voltage ripple when a hysteretic comparator is used.

Referring now to FIG. 4, a step-down switching regulator, in accordance with the invention, is shown. The switching regulator comprises a main, input switch 84 and a low pass filter, which, in this particular circuit, comprises an LC circuit 86 that includes an inductor 88 and a capacitor 90. The switch 84 includes an input 92, an output 94, and a control line 96. The switch 84 can comprise any suitable controllable switch, for example a bipolar transistor or a FET device. A free wheeling diode 98 provides a current path for the inductor 88 when the switch 84 is opened. The circuit includes two feedback loops. The first feedback loop 100 is a quick response feedback that includes a comparator 102. It will be appreciated that the feedback loop 100 will include an appropriate driver (not shown) which can, for example, be included in the circuitry of the comparator 102. The second feedback loop 104 is a relatively slow response feedback that includes an error amplifier 106. The slow response feedback can be used to sense the voltage at a point external to the switching circuit, and can, for instance, be used to sense the voltage at a remote location to detect power line fluctuations. In contrast, the feedback loop 100 is a fast feedback loop connected to the output line. The comparator 102 includes built-in hysteresis, thereby providing a hysteretic window defining an upper voltage limit $V_1$, indicated by reference numeral 110 in FIG. 7, and a lower voltage limit $V_2$ indicated by reference numeral 112. The voltage limits $V_1$ and $V_2$ can be located on either side of a voltage $V_3$ that corresponds to the output of the amplifier 106. In FIG. 7 the voltage limits $V_1$, and $V_2$ are shown to be symmetrically located on either side of $V_3$. This need not be the case. The voltage limits $V_1$, and $V_2$ could be asymmetrically located with respect to $V_3$. Either $V_1$ or $V_2$ could, for example, coincide with $V_3$. Since the delay time of the feedback loop 100 is relatively small, any switching delay due to the delay in the feedback loop 100 is insignificant in comparison with the effect of hysteresis. Furthermore, the hysteretic affect can be accurately determined in the comparator 102. Thus the frequency of the switching circuit is extremely will defined and remains virtually unaffected by loop delays. The comparator 102 seeks to keep the circuit output voltage, at the circuit output 107, at a fixed value. In the absence of resistor ladders 113, 114, the comparator 102 seeks to keep the circuit output voltage equal to the level at its positive terminal 116, the hysteresis causing a constant peak-to-peak ripple in the output voltage at the circuit output 107. In the case of input line or output load transients, the comparator 102 quickly detects output voltage changes and switches the switch 84 either on or off to compensate for the voltage fluctuation. Since the first feedback loop 100 operates independently of the error amplifier 106, no delay is caused by the response time of the error amplifier 106. Therefore, by choosing a fast comparator 102, a circuit with a well defined operating frequency and a quick response time is provided.

The second feedback loop 104, which includes the error amplifier 106, provides improved output set point accuracy, and can be used for remote sensing. It serves to compensate for voltage fluctuations at the point along the output line from which the feedback is taken. The loop 104 is significantly slower than the loop 100, but does not interfere with the speed of the loop 100. The amplifier 106 compares the output voltage against a reference voltage and ensures output accuracy under all load and other variations. The amplifier 106 can be used to sense the output voltage at a remote location and compensate for power line voltage loss. The negative input 120 to the amplifier 106 comprises a sawtooth waveform superimposed on a DC voltage. This signal is derived from the charging and discharging of the capacitor 90. In practice the output capacitor 90 of the LC circuit 86 is typically implemented using electrolytic or tantalum capacitors. At the switching frequency the impedance of these capacitors is dominated by their parasitic series resistance. Thus, at the switching frequency, these capacitors have the characteristics of a resistor. The sawtooth current of the inductor thus produces an output voltage having a sawtooth waveform proportional to the inductor current. However, even if a "pure" capacitor were to be used, its charging and discharging exponential waveform could be considered as linear in the first order approximation. Any variations in the power line voltage thus shift the DC base of the signal on line 120 to cause a change in the output voltage of the amplifier 106. Due to the slow response time of the amplifier 106, it is easy to filter out any noise that may be imposed on long, remote sensing lines. Thus the output of the amplifier 106 can be approximated as a DC signal. As mentioned above, the second feedback loop provides improved compensation for voltage fluctuations along the output line. It will be appreciated that the switching regulator circuit could be used without the second feedback loop 104, making use merely of the first feedback loop 100, with its hysteretic comparator 102 receiving a DC reference voltage at its positive terminal 116. Clearly the absence of the second loop 104 will, however, reduce the compensation accuracy for voltage fluctuations along the output line.

Figure 5:
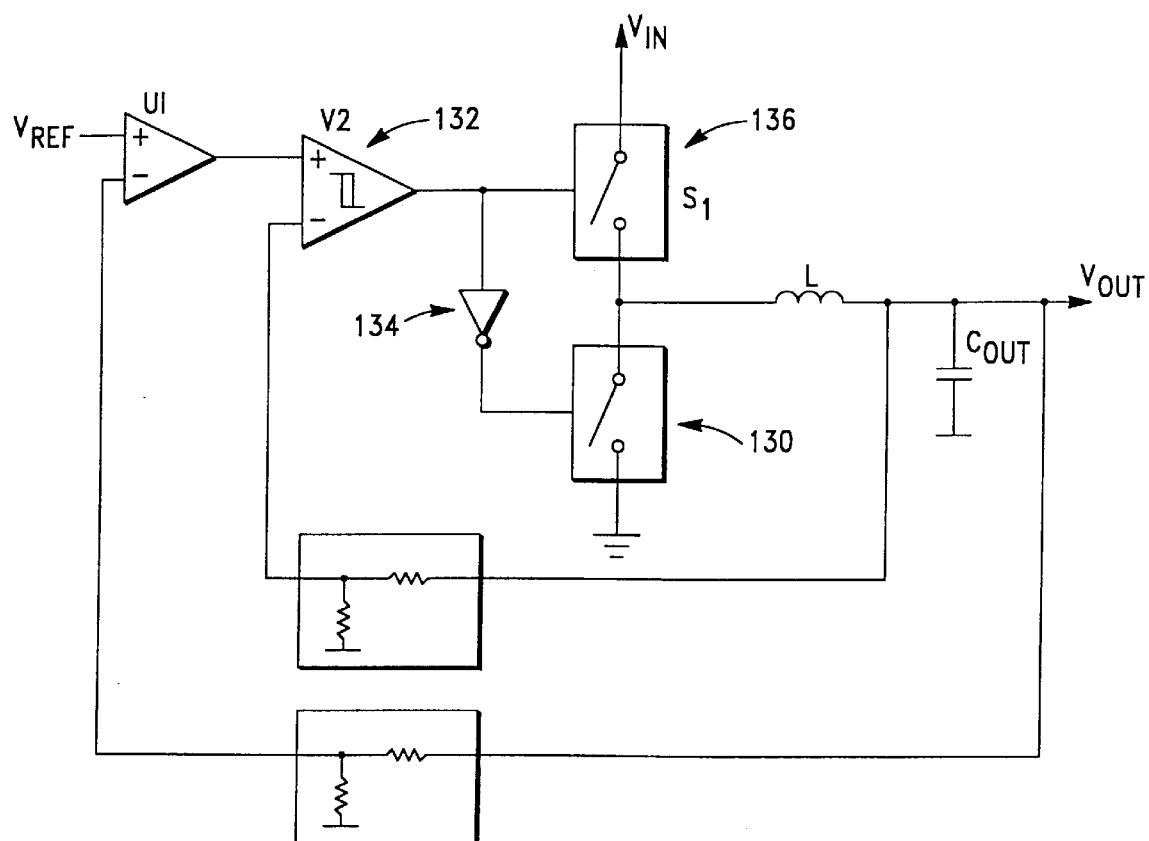
FIG. 5 is schematic circuit diagram of another embodiment of a step-down switching regulator in accordance with the invention.

FIG. 5. illustrates another embodiment of a step-down switching regulator in accordance with the invention. The circuit is virtually identical to that illustrated in FIG. 4. However, the free wheeling diode is replaced by a second switch 130. The switch 130 is controlled by an output from the comparator 132, via an invertor 134. Thus when the main, input switch 136 is on, switch 130 is off, and vice versa. While a simple invertor is illustrated in FIG. 5, more complex circuitry could be provided to prevent simultaneous conduction of switches 130 and 136. In order to avoid the possibility of both switches 130, 136, conducting simultaneously, the circuits of FIGS. 4 and 5 can be combined by connecting a free wheeling diode in parallel to the switch 130.

Figure 8:
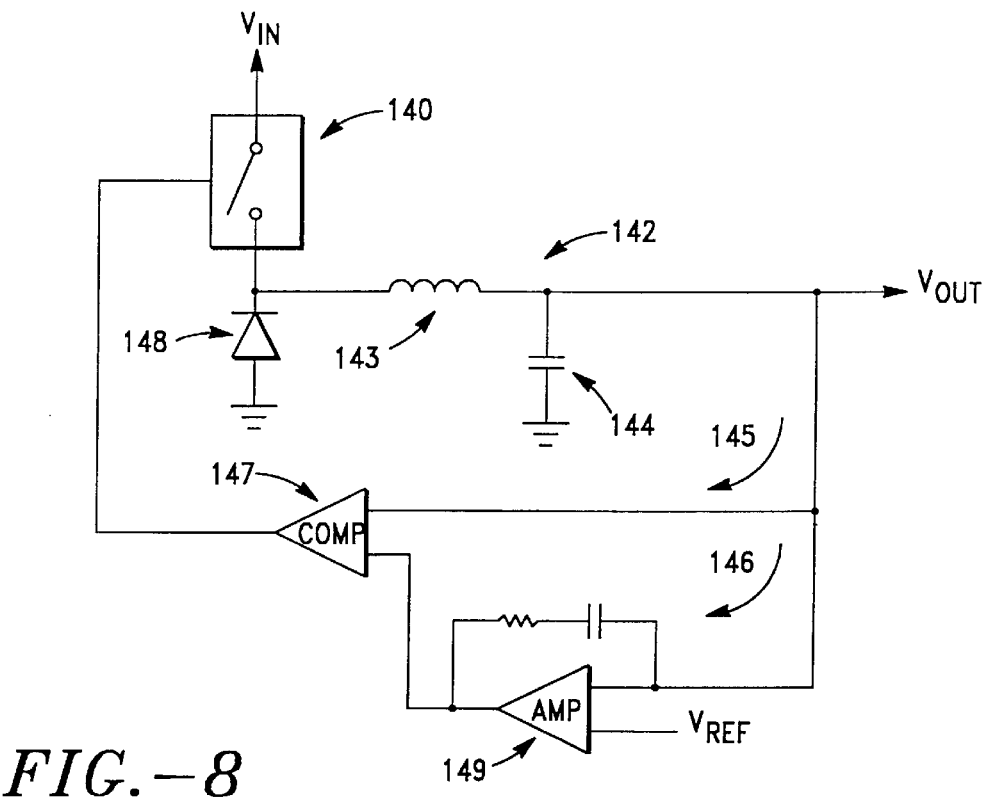
FIG. 8 is a schematic circuit diagram of yet another embodiment of a step-down switching regulator in accordance with the invention.

Yet another embodiment of the invention is illustrated in FIG. 8. The circuit includes a switch 140 and a low pass filter, in this case an LC filter 142 comprising an inductor 143 and a capacitor 144. The circuit includes a first feedback loop 145, and a second feedback loop 146. The first feedback loop 145 includes a comparator 147, the output of which is connected to the control line of the switch 140. This switch 140 includes a free wheeling diode 148. The loop response of the feedback loop 145 is relatively fast, since it directly senses the output voltage. It, thus, provides rapid compensation for both input line and load voltage fluctuations. The feedback loop 146, once again, includes an error amplifier 149, which provides for a longer loop response time.

Figure 9:
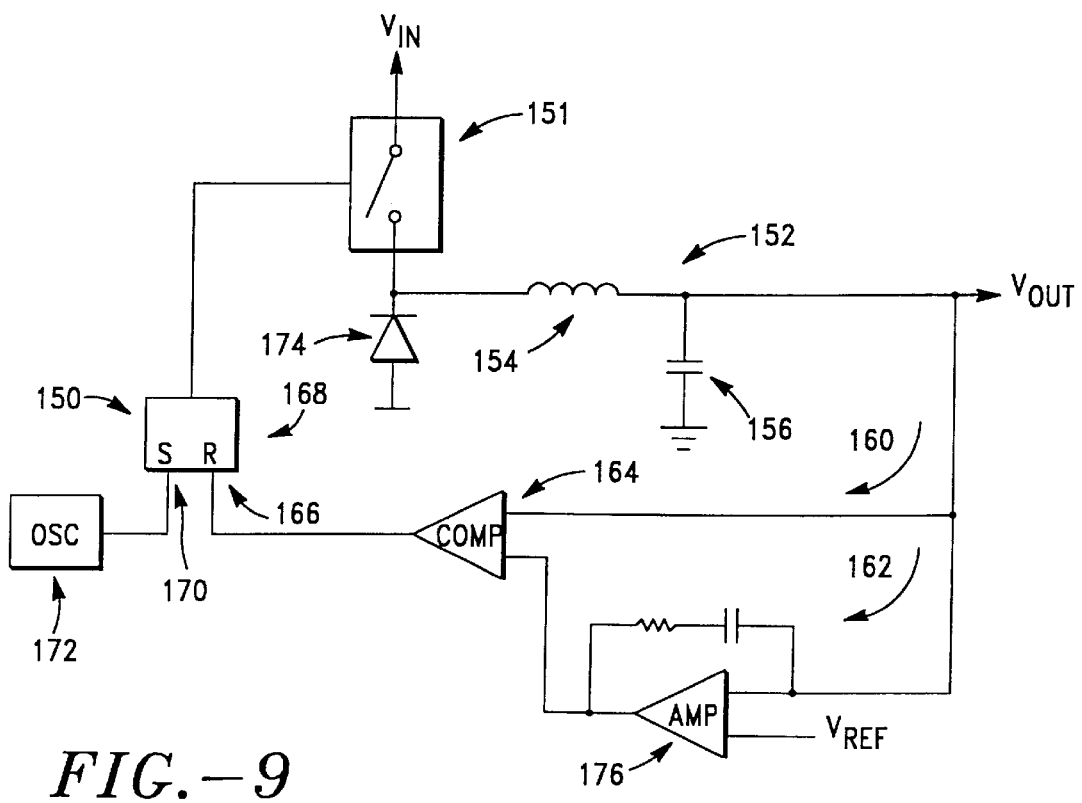
FIG. 9 is a schematic circuit diagram of yet another embodiment of a step-down switching regulator in accordance with the invention.

The loop 146, however, does not affect the response time of the loop 145. The circuit is distinguishable over the prior art circuit illustrated in FIG. 3 insofar as it includes a second voltage feedback loop for providing improved voltage compensation. Another embodiment of the invention is illustrated in FIG. 9. This circuit is similar to the circuit of FIG. 8, but further includes a frequency reference 150. The circuit includes a switch 151, and a low pass filter, in this case an LC filter 152 comprising an inductor 154 and a capacitor 156. The circuit further includes a first feedback loop 160, and a second feedback loop 162. The first feedback loop 160 includes a comparator 164 which is fed into the frequency reference 150, which in this embodiment comprises an oscillator and flip flop circuit. The output of the comparator 164 is fed into the reset input 166 of the R-S flip flop 168. The set input 170 of the flip flop 168 is connected to the oscillator 172. The output from the flip flop 168 controls the switch 151 which includes a free wheeling diode 174. The loop response of the feedback loop 160 is relatively fast, since it directly senses the output voltage. It, thus, provides rapid compensation for both input line and load voltage fluctuations. The feedback loop 162, once again, includes an error amplifier 176, which provides for a longer loop response time. The loop 162, however, does not affect the response time of the loop 160. The circuit is distinguishable over that of the prior art illustrated in FIG. 2 insofar as it eliminates the current sensor of the prior art circuit. This provides for a superior voltage transient response.

Figure 10:
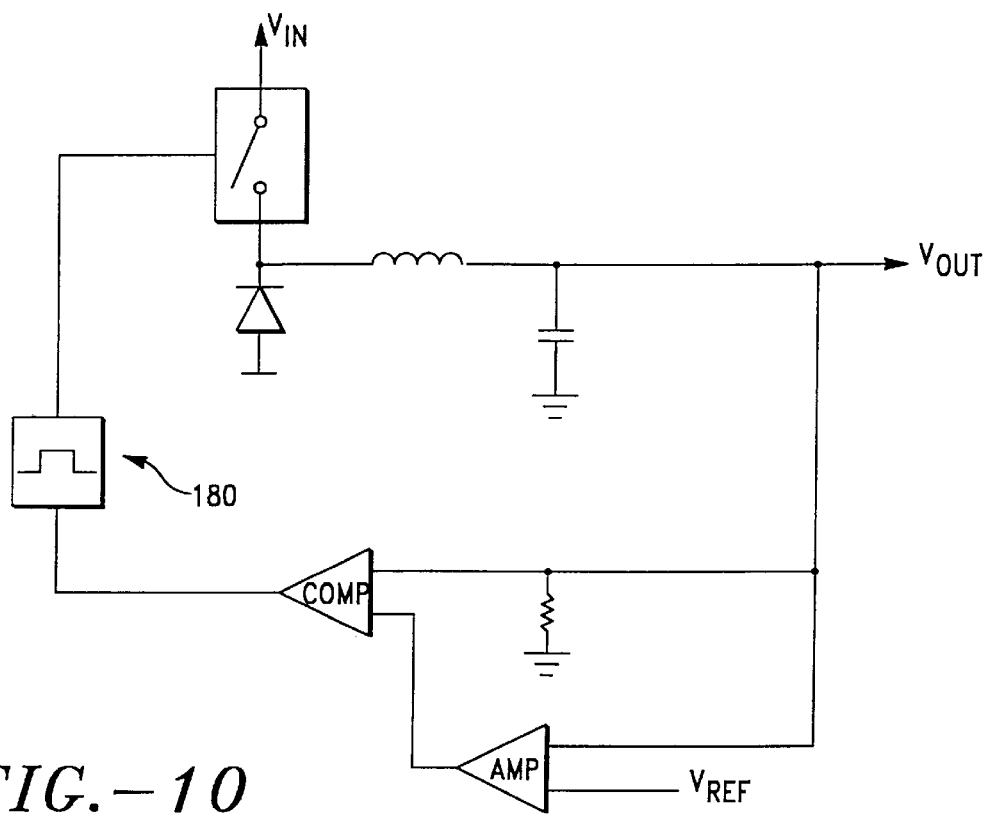
FIG. 10 is a schematic circuit diagram of yet another embodiment of a step-down switching regulator in accordance with the invention.

Another embodiment in accordance with the invention is shown in FIG. 10. Instead of the oscillator and flip flop arrangement, a one shot 180 is provided. This serves as a frequency reference by establishing a constant off time.

Figure 11:
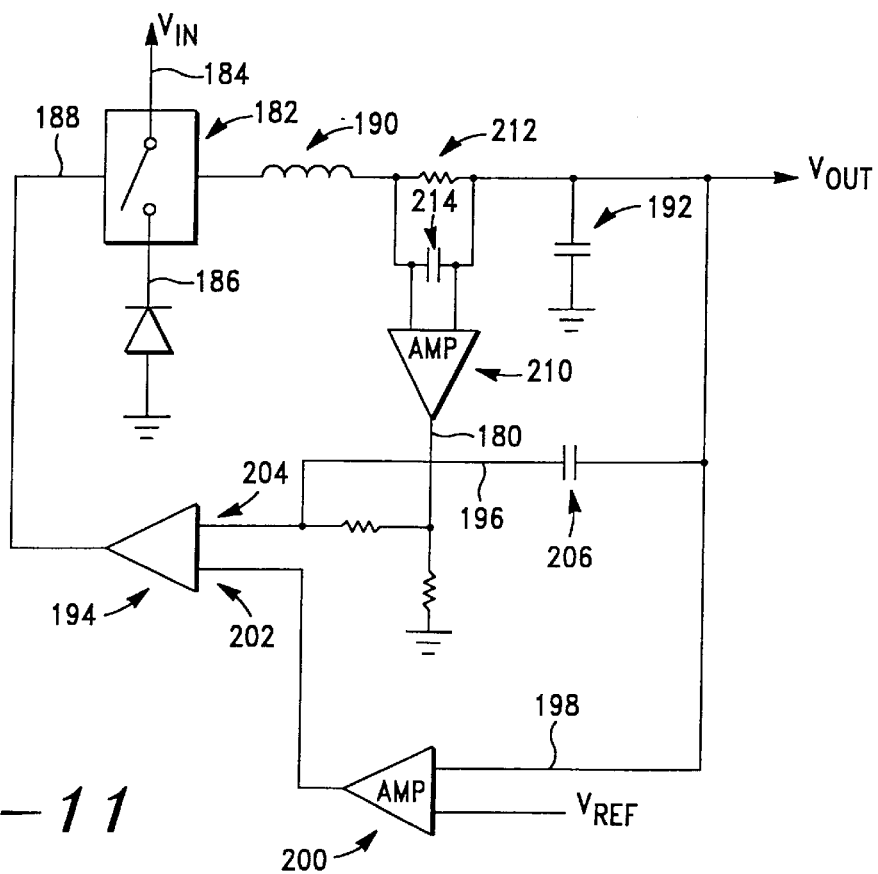
FIG. 11 is a schematic circuit diagram of yet another embodiment of a step-dow n switching regulator in accordance with the invention.

Another embodiment of the invention is illustrated in FIG. 11. This circuit is similar to the one illustrated in FIG. 8. It, however, further includes a current feedback loop 180. As in the circuit illustrated in FIG. 8, the circuit illustrated in FIG. 11 includes a switch 182 having an input 184, an output 186, and a control line 188. It includes a low pass filter which, in this embodiment, takes the form of an LC filter comprising an inductor 190 and a capacitor 192. The comparator 194 is shown as being directly connected to the control line 188 of the switch 182. Clearly, a frequency reference could be included in a manner similar to that illustrated and described with respect to FIGS. 9 and 10. The circuit includes a first feedback loop 196, a second feedback 198, and the current feedback 180. As in the circuit illustrated in FIG. 8, the feedback 198 includes an amplifier 200, the output of which is connected to a first input 202 of the comparator 194. The first feedback loop 196 is fed into a second input 204 of the comparator 194. The current feedback loop is also connected to the second input 204 of the comparator 194. In order to accommodate both the first feedback loop and the current feedback 180, the feedback loop 196 includes a capacitor 206 to block the DC offset, thereby AC coupling the first feedback loop 196 to the comparator 194. The current feedback loop 180 includes an amplifier 210 connected across a resistor 212 thereby establishing a voltage waveform corresponding to the current through the inductor 190. The feedback 180 further includes a capacitor 214 for eliminating the AC element of the load current. Thus the output of the amplifier corresponds to the DC output and provides a rapid response to load current fluctuations.

The embodiments described above all comprised step-down switching regulators. The invention is, however, not limited to step-down regulators, but extends also to forward mode regulators, for example, buck regulators. These have the advantage of allowing voltage to be stepped up or down. They make use of a transformer to optimize the input/output ratio by virtue of the transformer winding ratio.

Figure 12:
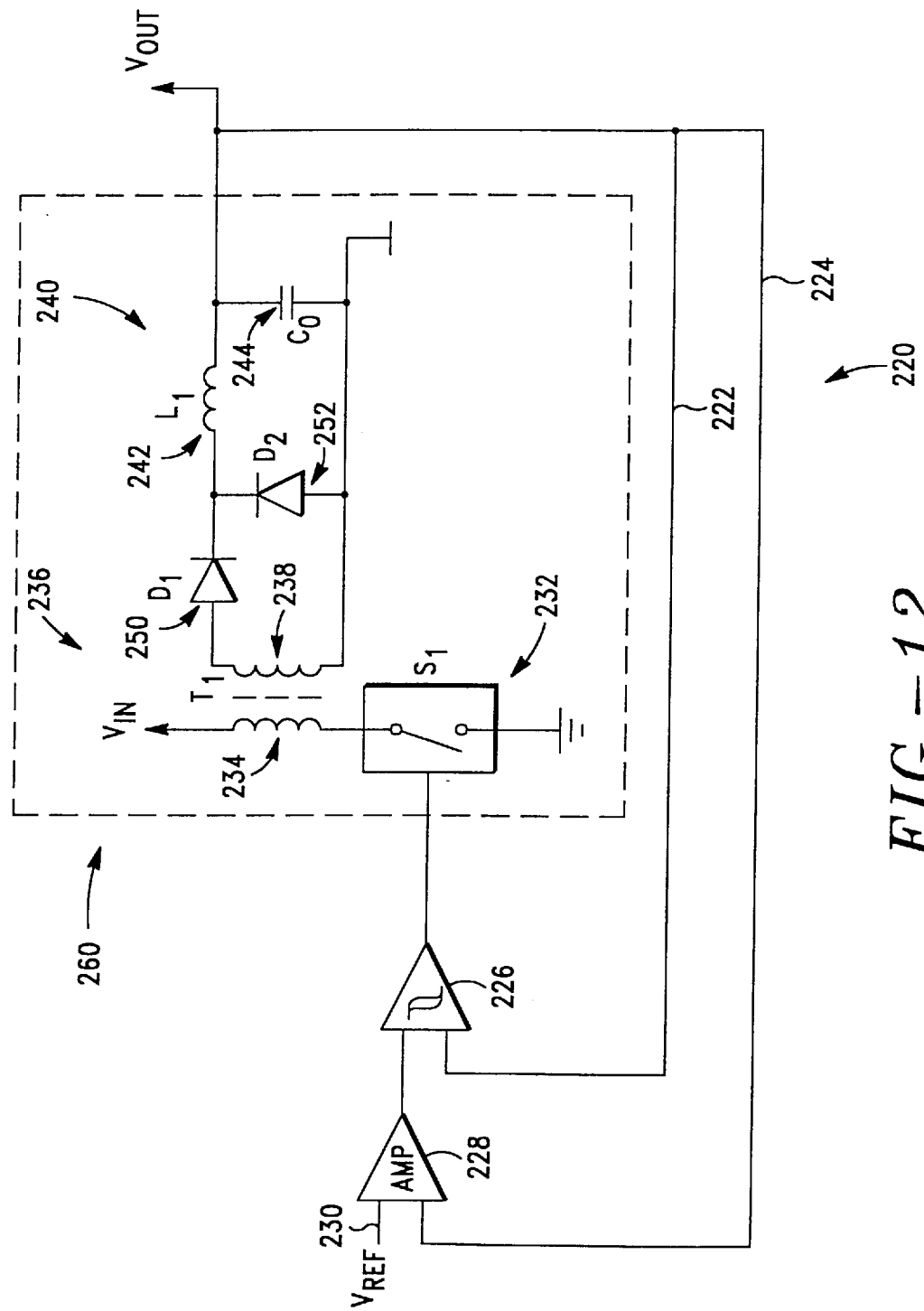
FIG. 12 is a schematic circuit diagram of a forward mode regulator in accordance with the invention.

Referring specifically to FIG. 12, there is shown a forward mode regulator in accordance with the invention. The regulator is indicated generally by reference numeral 220 and includes features similar to the step-down switching regulator of FIG. 4. Like the regulator of FIG. 4, the forward mode regulator of FIG. 12 includes a fast feed back loop 222 and a slow feed back loop 224. The fast feed back loop 222 extends from the output to a hysteretic comparator 226. The slow feed back loop 224 extends from the output to an amplifier 228, the other input 230 of which receives a reference voltage. The comparator 226 controls a switch 232. In this circuit, however, the switch is not directly connected to the output, but controls the voltage across the primary winding 234 of a transformer 236. The secondary winding 238 of the transformer 236 is, in turn, connected to a low pass filter, which in this case, comprises an LC circuit 240. The LC circuit 240 includes an inductor 242 and a capacitor 244. A diode 250 provides half-wave rectification of the signal, while the diode 252 provides a current path for the inductor 242 when the switch 232 is opened. The power block 260 is therefore slightly different to the corresponding circuitry described in the step-down switching regulators of FIGS. 4–11. The rest of the circuitry is, however, similar to that illustrated in FIG. 4. In the circuit of FIG. 12., when the switch 232 turns on, the diode 250 is forward biased and the current builds up in the inductor 242. The voltage across the inductor may be given by the equation:

$$V_L = V_{in} \times n - V_{out},$$

where $V_L$ is the inductor voltage;

$V_{in}$ is the voltage across the primary winding;

$V_{out}$ is the output voltage; and n is the transformer ratio.

When the switch 232 turns off, the diode 250 is reverse biased and the diode 252 conducts to provide a current path for the inductor 242. The behavior of the circuit is therefore similar to the step-down regulator of FIG. 4, with the exception that during the time that the switch 232 is closed, the inductor voltage is dependent upon the transformer ratio. While only one switch is shown, more switches could be used for increased power.

It will be appreciated that a power block similar to the one indicated by reference numeral 260 could be used in circuits similar to those illustrated in FIGS. 5–11. Since those circuits would, apart from the power block, remain substantially the same as illustrated in FIGS. 5–11, the circuits have not been repeated.

Clearly the circuits discussed and illustrated above, are merely illustrative of the invention. Other circuits may be devised without departing from the scope of the invention.

I claim:

1. A switching regulator comprising:

a first switch, having an input, an output and a control line;

a low pass filter connected to an output of the regulator;

a first voltage feedback loop from an output of the regulator to the control line of the switch, wherein the feedback loop includes a comparator having an output, a first input connected to the output of the regulator, and a reference voltage input, the feedback loop further including a frequency reference connected to the control line of the switch for regulating the switching of the switch; and a second feedback loop from the output of the regulator, the second feedback loop including an amplifier having a DC voltage input, and an output which is connected to the reference voltage input of the comparator.

2. A regulator of claim 1, further comprising a free wheeling diode connected to ground and providing a current path for the inductor when the first switch is opened.

3. A regulator of claim 1, further comprising a second switch connected to ground to provide a current path for the inductor when the first switch is opened, the second switch being controlled by a signal that is inverted relative to the signal switching the first switch, to insure that only one of the switches is open at any one time.

4. A regulator of claim 1, wherein the frequency reference comprises an oscillator and a flip flop, wherein the oscillator is connected to a first input of the flip flop, and the output of the comparator is connected to a reset input of the flip flop, an output of the flip flop being connected to the control line of the switch.

5. A regulator of claim 1, wherein the frequency reference comprises a one shot connected between the output of the comparator and the control line of the switch.

6. A regulator of claim 1, further comprising a transformer, wherein the voltage across a primary winding of the transformer is controlled by the switch, and wherein a secondary winding is connected to the lowpass filter.

7. A switching regulator comprising:
a first switch having an input, an output and a control line;
a low pass filter connected to an output of the regulator;
a first voltage feedback from an output of the regulator to the control line of the switch, including a comparator having first and second inputs, and an output which is connected to the control line of the switch, the first voltage feedback being AC coupled to the second input of said comparator; and
a second, voltage feedback from the output of the regulator, wherein the second, voltage feedback includes an amplifier having a reference voltage input and an output connected to the first input of the comparator.

8. A regulator of claim 7, further comprising current feedback that is DC coupled to the second input of the comparator.

9. A switching regulator for supplying a stable output voltage to an output terminal from a supplied input source, comprising:
a switch selectively switching the input source to an output terminal thereof to form a modulated switch output under control of a control line, the modulated switch output being composed of a D.C. offset voltage with a superimposed ripple voltage;
a low pass filter connected between the output of said switch and the output terminal of said regulator and smoothing the modulated switch output to develop said output voltage;
a pulse modulator supplying a pulse train to the control line of said switch to selectively connect said switch;
a first voltage feedback loop comparing the D.C. output voltage of said switching regulator to a desired voltage reference to develop a voltage error signal; and
a second voltage feedback loop, operatively connected to said pulse modulator and supplying the ripple voltage to said pulse modulator;
said pulse modulator varying the duty cycle of said switch based on said ripple voltage to quickly control the output voltage of said switching regulator;
variations in the load or voltage of said output developing a substantially instantaneous variation in said ripple voltage to stabilize said output voltage by quickly correct errors sensed therein.

10. The regulator of claim 9, further comprising a transformer, wherein the voltage across a primary winding of the transformer is controlled by the switch, and wherein a secondary winding is connected to the low pass filter.

11. The switching regulator of claim 9 wherein said switch switches the input source to the output terminal thereof at a switch frequency, said ripple voltage being related to said switch frequency.

12. The switching regulator of claim 9 wherein said first voltage feedback loop stabilizes the output voltage of said switching regulator.

13. The switching regulator of claim 9 wherein said first voltage feedback loop monitors the D.C. offset voltage at said output terminal.

14. The switching regulator of claim 9 wherein said first voltage feedback loop monitors the output voltage of said switching regulator remote from said switching regulator.

15. The switching regulator of claim 9 wherein said pulse modulator comprises a comparator comparing the ripple voltage with an error voltage, the ripple voltage further supplying a ramp signal to said pulse modulator.

16. The switching regulator of claim 15 wherein said first feedback loop comprises an error amplifier receiving a reference voltage at one input thereof and the D.C. output voltage of said switching regulator as a second input thereof to produce said error voltage.

17. The switching regulator of claim 16 wherein said error amplifier includes an integrating feedback path.

18. The switching regulator of claim 16 wherein said switch includes first and second switch devices each having a switch control terminal, one of said switch devices having its control terminal directly connected to said control line while the other of said switch devices being connected to said control line through an inverter.

19. The switching regulator of claim 16 further comprising a current feedback path monitoring output current at said output terminal and providing inherent current limiting to said switching regulator.

20. The switching regulator of claim 9 wherein said low pass filter includes an inductor serially connected between said switch and said output terminal and a capacitor connected between said output terminal and ground.

21. The regulator of claim 20, further comprising a free wheeling diode connected to ground and providing a current path for the inductor when the first switch is opened.

22. The switching regulator of claim 9 wherein said pulse modulator includes,
a flip flop having a set terminal and a reset terminal and being connected to said control line of said switch,
an oscillator for setting the flip flop at a controlled frequency, and
a comparator comparing the ripple voltage with an error voltage, the ripple voltage further supplying a ramp signal to the reset terminal of said flip flop.

23. The switching regulator of claim 9 wherein said pulse modulator includes,
a one shot producing a constant duration pulse and being connected to said control line of said switch, and
a comparator comparing the ripple voltage with an error voltage, the ripple voltage further supplying a ramp signal to the one shot at a periodically varying interval.

24. A method of converting an input voltage into a stable output voltage supplied to an output terminal from a supplied input source, comprising:

a) selectively switching the input source to form a modulated switch output composed of a D.C. offset voltage with a superimposed ripple voltage using a switch having a pulse modulatable control line;

b) smoothing the modulated switch output to develop said output voltage;

c) supplying a pulse train to the control line of said switch to selectively connect said switch;

d) comparing the D.C. output voltage to a desired voltage reference to develop a voltage error signal in a first voltage feedback loop; and e) supplying the ripple voltage to said pulse modulator in a second voltage feedback loop to aid in the development of said pulse train;

said step c) of supplying varying the duty cycle of said switch based on said ripple voltage to quickly control the output voltage of said switching regulator; variations in the load or voltage of said output developing a substantially instantaneous variation in said ripple voltage to stabilize said output voltage by quickly correcting errors sensed therein.

25. The method of claim 24 wherein said pulse train is supplied by said step c) of supplying at the output of a comparator comparing the ripple voltage with a second voltage.

26. A method of claim 25, wherein the comparator has built-in hysteresis.

27. The method of claim 25 wherein said step e) of supplying compares the D.C. output voltage to a reference voltage in a differential amplifier and supplies the difference to the second input of the comparator of said step c).

28. A method of claim 27, wherein the reference voltage is a DC reference voltage.

* * * * *